US012576616B2

(12) United States Patent
Kim et al.

(10) Patent No.: US 12,576,616 B2
(45) Date of Patent: Mar. 17, 2026

(54) ALUMINUM ALLOY SHEET AND MANUFACTURING METHOD THEREOF

(71) Applicant: SAMSUNG ELECTRONICS CO., LTD., Suwon-si (KR)

(72) Inventors: Jongbo Kim, Suwon-si (KR); Jiho Lim, Suwon-si (KR); Hyungki Park, Suwon-si (KR); Sungyoung Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 112 days.

(21) Appl. No.: 17/983,279

(22) Filed: Nov. 8, 2022

(65) Prior Publication Data

US 2023/0146301 A1      May 11, 2023

Related U.S. Application Data

(63) Continuation of application No. PCT/KR2022/017351, filed on Nov. 7, 2022.

(30) Foreign Application Priority Data

Nov. 8, 2021      (KR) ........................ 10-2021-0152510

(51) Int. Cl.
*C25D 11/12* (2006.01)
*B32B 15/20* (2006.01)
(Continued)

(52) U.S. Cl.
CPC .............. *B32B 15/20* (2013.01); *C22C 21/00* (2013.01); *C25D 11/12* (2013.01); *C25D 11/16* (2013.01);
(Continued)

(58) Field of Classification Search
CPC .......... C25D 11/12; C25D 11/14; B41N 3/034
See application file for complete search history.

(56) References Cited

U.S. PATENT DOCUMENTS 5,472,788 A      12/1995   Benitez-Garriga
6,358,391 B1       3/2002   Okabayashi et al.
(Continued)

FOREIGN PATENT DOCUMENTS

CN           102616049     *   8/2012
CN           112144087 A     12/2020
(Continued)

OTHER PUBLICATIONS

International Search Report and Written Opinion for International Application No. PCT/KR2022/017351; International Filing Date Nov. 7, 2022; Date of Mailing Feb. 17, 2023; 10 Pages.
(Continued)

*Primary Examiner* — Tabassom Tadayyon Eslami
(74) *Attorney, Agent, or Firm* — CANTOR COLBURN LLP

(57)           ABSTRACT

An electronic device according to various embodiments of the disclosure includes: a display; and a housing adjacent to the display, wherein at least a part of the housing includes: an aluminum alloy layer; a first film layer formed on the aluminum alloy layer; and a second film layer formed between the aluminum alloy layer and the first film layer and which includes multiple snowflake structures arranged adjacent to the first film layer. The first film layer is formed by a first anodizing process using a first voltage on the aluminum alloy layer, and the second film layer is formed by a second anodizing process using a second voltage on the aluminum alloy layer after the first anodizing process.

15 Claims, 15 Drawing Sheets

(51) Int. Cl.

| | | |
|---|---|---|
| *C22C 21/00* | (2006.01) | |
| *C25D 11/16* | (2006.01) | |
| *C25D 11/24* | (2006.01) | |

(52) U.S. Cl.

CPC .......... *C25D 11/243* (2013.01); *C25D 11/246* (2013.01); *B32B 2255/06* (2013.01); *B32B 2255/20* (2013.01); *B32B 2311/24* (2013.01); *B32B 2457/20* (2013.01)

(56) References Cited

U.S. PATENT DOCUMENTS

| | | | |
|---|---|---|---|
| 2006/0257675 A1 | 11/2006 | Chun et al. | |
| 2014/0193607 A1 | 7/2014 | Browning et al. | |
| 2016/0312374 A1* | 10/2016 | Duffy | C25D 11/06 |
| 2017/0221597 A1* | 8/2017 | Martin Gonzalez | C25D 11/026 |

FOREIGN PATENT DOCUMENTS

| | | | |
|---|---|---|---|
| DE | 202016006606 | * | 3/2017 |
| EP | 3249494 | * | 11/2017 |
| EP | 4332276 A1 | | 3/2024 |
| JP | 03-046122 | * | 2/1991 |
| JP | 2003011099 A | | 1/2003 |
| JP | 2007154302 A | | 6/2007 |
| JP | 2010229537 A | | 10/2010 |
| JP | 2012162769 A | | 8/2012 |
| JP | 5968371 B2 | | 7/2016 |
| JP | 2018090897 A | | 6/2018 |
| JP | 2020180334 A | | 11/2020 |
| KR | 20080007405 A | | 1/2008 |
| KR | 101235350 B1 | | 2/2013 |
| KR | 20170076791 A | | 7/2017 |
| KR | 20190038696 A | | 4/2019 |
| KR | 20190142593 A | | 12/2019 |
| TW | 1421371 | * | 1/2014 |
| WO | 2014102758 A1 | | 7/2014 |
| WO | 2020160690 A1 | | 8/2020 |

OTHER PUBLICATIONS

Extended European Search Report corresponding to Application No. 22890477.7-1103; Dated Jan. 3, 2025.

European Office Action corresponding to Application No. 22890477. 7-1103; Dated Sep. 2, 2025.

* cited by examiner

<20minutes>    <25minutes>    <30minutes>    <35minutes>

630

632

ALUMINUM ALLOY SHEET AND MANUFACTURING METHOD THEREOF

CROSS REFERENCE TO RELATED APPLICATION

This application is a PCT-Bypass Continuation of International Patent Application No. PCT/KR2022/017351, filed on Nov. 7, 2022, which is based on and claims the benefit of a Korean patent application number 10-2021-0152510, filed on Nov. 8, 2021, in the Korean Intellectual Property Office, the disclosure of each of which is incorporated by reference herein in its entirety.

BACKGROUND

Technical Field

Various embodiments of the disclosure relate to an aluminum sheet that can be anodized, and a method for manufacturing the same.

Description of Related Art

In line with the remarkable development of information/communication technologies and semiconductor technologies, there has been widespread use of various kinds of electronic devices which has increased at a rapid pace. Particularly, recent electronic devices have been developed to be carried and used for communication.

Electronic devices may refer to devices configured to perform specific functions according to installed programs, such as home appliances, electronic wallets, portable multimedia players, mobile communication terminals, tablet PCs, video/audio devices, desktop/laptop computers, and vehicle navigation systems. For example, electronic devices may output stored information as sounds or images. In line with the high degree of integration of electronic devices and the widespread use of super-fast large-capacity wireless communication technologies, it has recently become possible to equip a single electronic device (for example, a mobile communication terminal) with various functions. For example, a single electronic device can include not only a communication function, but also an entertainment function (for example, gaming), a multimedia function (for example, music/video playback), communication and security functions for mobile banking and the like, a scheduling function, and an electronic wallet function. Such electronic devices have become sufficiently compact such that users can conveniently carry the same.

Recently, aluminum metal is widely used as the exterior material of high quality portable electronic devices. In general, aluminum metal is a lightweight metal material most used by the human race so far, and applied in many fields. In particular, aluminum alloy materials include aluminum as the major component and include, as major alloy elements, copper, magnesium, manganese, silicon, tin, or zinc.

Various types of surface treatment processes exist to adapt aluminum alloy materials for use as an exterior material and, among the same, an anodizing process refers to a surface treatment method in which a metal is electrically connected to a positive electrode, and the metal surface is oxidized by oxygen generated from the positive electrode, thereby generating an aluminum oxide film. If an aluminum alloy material is anodized, an oxide film ($Al_2O_3$) having a nanometer-level diameter grows evenly up to tens of micrometers, and the generated oxide film has a high level of hardness, thereby improving the wear resistance of aluminum. Anodized metal surfaces have unique textures, thereby having aesthetic appeal, and are anti-corrosive, thereby having excellent resistance to corrosion.

SUMMARY

Recently, aluminum alloy exterior materials for portable electronic devices are required to have strength, wear resistance, corrosion resistance, electric insulation, various textures of exterior design, and color implementation.

Existing anodizing processes have restrictions on achievable color implementations and texture implementations (for example, low chroma) due to the gloss specific to metals, and require an additional process such as sanding or etching for texture implementation, thereby increasing costs and making quality management difficult.

A physical method for implementing various texture colors with anodized aluminum alloy materials is sanding. If necessary, various media/process condition (for example, pressure, speed, distance) may be used to implement textures and exteriors. Etching, which is a chemical method, may be used to control the gloss or texture according to the condition (for example, temperature, concentration, activity) of a chemical. However, additional processing and processes may increase costs and may generate stains and a difference in quality between products.

An electronic device according to various embodiments of the disclosure may include: a display; and a housing adjacent to the display, wherein at least a part of the housing includes: an aluminum alloy layer processed in a designated shape; a first film layer formed on the aluminum alloy layer; and a second film layer which is formed between the aluminum alloy layer and the first film layer and includes multiple snowflake structures arranged adjacent to the first film layer, the first film layer is formed by a first anodizing process using a first voltage on the aluminum alloy layer, and the second film layer is formed by a second anodizing process using a second voltage on the aluminum alloy layer after the first anodizing process.

A method for processing an aluminum exterior material according to various embodiments of the disclosure may include: processing an aluminum alloy layer into a designated shape; and performing an anodizing treatment on the processed aluminum alloy layer, wherein the performing of an anodizing treatment includes: a first anodizing treatment of forming a first film layer on the processed aluminum alloy layer by using a first voltage on the processed aluminum alloy layer; and after performing the first anodizing treatment, a second anodizing treatment of forming a second film layer on the processed aluminum alloy layer by using a second voltage, and the second film layer is positioned between the first film layer and the processed aluminum alloy layer and includes multiple snowflake structures arranged adjacent to the first film layer.

According to various embodiments of the disclosure, primary and secondary variable constant voltages (voltages changed once) may be used to implement a glossy pearl appearance on an aluminum alloy metal exterior material of a portable electronic device such that no additional physical/chemical processes are necessary, thereby incurring no additional costs, and stable quality maintenance is possible while maintaining the advantages of existing anodizing techniques.

DETAILED DESCRIPTION

Figure 1:
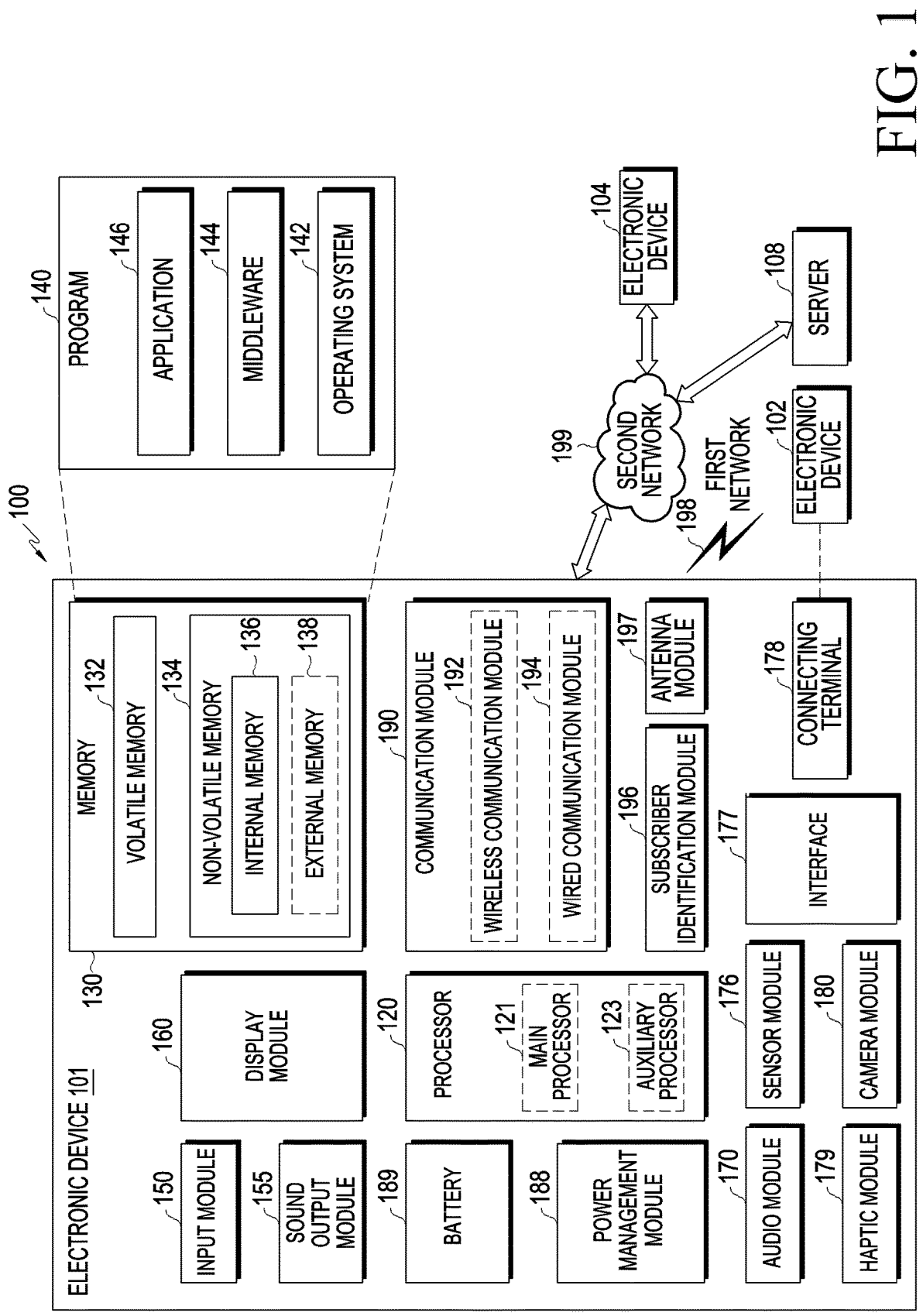
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
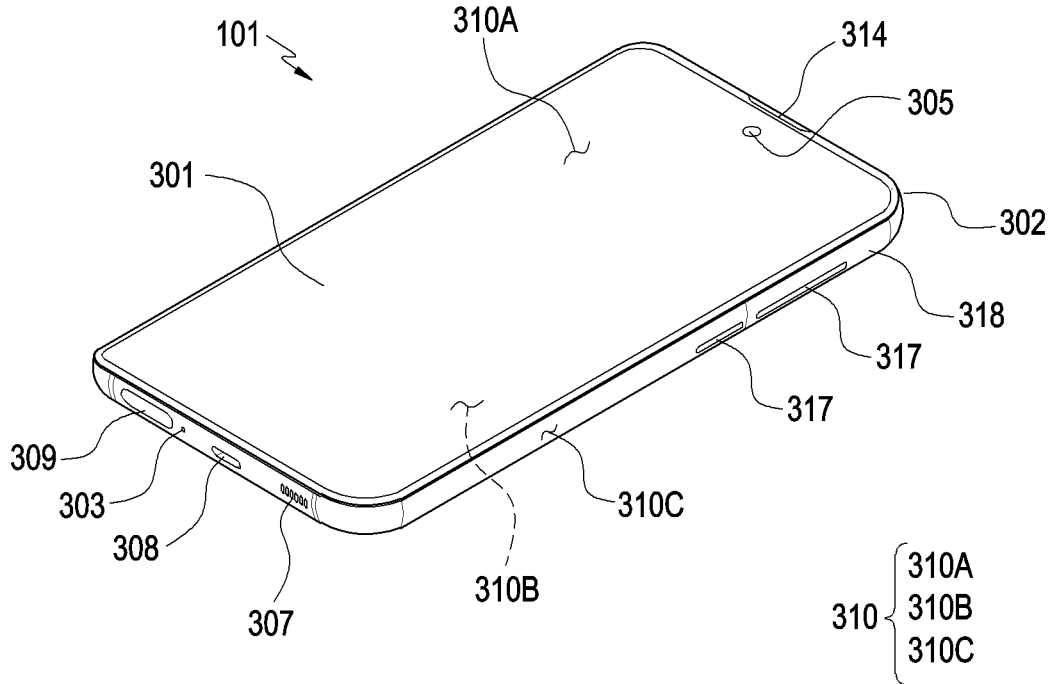
FIG. 2 is a front perspective view of an electronic device according to various embodiments of the disclosure.
Figure 3:
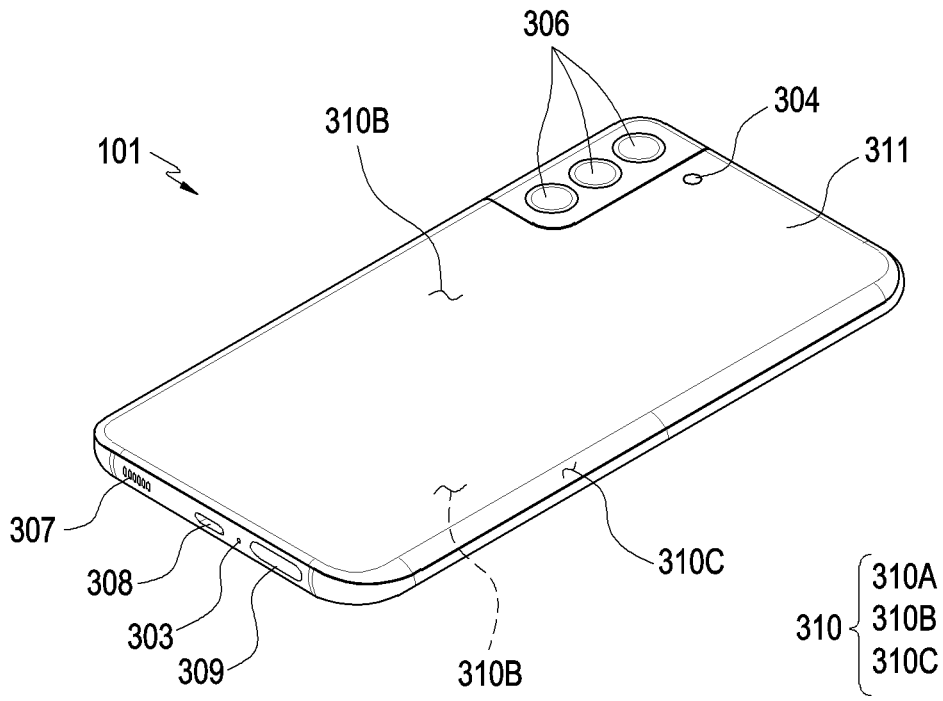
FIG. 3 is a rear perspective view of an electronic device according to various embodiments of the disclosure.

FIG. 2 is a front perspective view of an electronic device 101 according to various embodiments of the disclosure. FIG. 3 is a rear perspective view of an electronic device 101 according to various embodiments of the disclosure.

Referring to FIG. 2 and FIG. 3, an electronic device 101 according to an embodiment may include a front surface 310A, a rear surface 310B, and a housing 310 including a side surface 310C configured to surround the space between the front surface 310A and the rear surface 310B. According to another embodiment (not shown), the housing 310 may be referred to as a structure which forms a part of the front surface 310A of FIG. 2, and the rear surface 310B and the side surface 310C of FIG. 3. According to an embodiment, at least a portion of the front surface 310A may be formed by a substantially transparent front plate 302 (e.g., a glass plate including various coating layers, or a polymer plate). The rear surface 310B may be formed by a rear plate 311. For example, the rear plate 311 may be formed of glass, ceramic, polymer, metal (e.g., aluminum, stainless steel (STS), or magnesium), or a combination of at least two of the above materials. The side surface 310C may be coupled to the front plate 302 and the rear plate 311, and may be formed by a side-surface bezel structure (or "a side-surface member") 318 including metal and/or polymer. According to an embodiment, the rear plate 311 and the side-surface bezel structure 318 may be integrally formed, and may include the same material (e.g., glass, a metal material such as aluminum, or ceramic). According to another embodiment, the front surface 310A and/or the front plate 302 may include a part of a display 301.

According to an embodiment, the electronic device 101 may include at least one of the display 301, audio modules 303, 307, and 314 (e.g., the audio module 170 of FIG. 1), a sensor module (e.g., the sensor module 176 of FIG. 1), camera modules 305 and 306 (e.g., the camera module 180 of FIG. 1), a key input device 317 (e.g., the input module 150 of FIG. 1), and connector holes 308 and 309 (e.g., the connecting terminal 178 of FIG. 1). In some embodiments, at least one (e.g., the connector hole 309) of elements of the electronic device 101 may be omitted therefrom, and the electronic device 101 may additionally include other components. According to an embodiment, for example, the display 301 may be visually exposed through a significant portion of the front plate 302.

According to an embodiment, the surface (or the front plate 302) of the housing 310 may include a screen display area formed as the display 301 is visually exposed. As an example, the screen display area may include the front surface 310A.

According to another embodiment (not shown), the electronic device 101 may include a recess or an opening formed in a part of the screen display area (e.g., the front surface 310A) of the display 301, and may include at least one of the audio module 314, a sensor module (not shown), a light-emitting element (not shown), and the camera module 305 which are aligned with the recess or opening. According to another embodiment (not shown), at least one of the audio module 314, a sensor module (not shown), the camera module 305, a fingerprint sensor (not shown), and a light emitting-element (not shown) may be included on the rear surface of the screen display area of the display 301.

According to another embodiment (not shown), the display 301 may be coupled to or disposed adjacent to a touch detection circuit, a pressure sensor capable of measuring the intensity (pressure) of touch, and/or a digitizer for detecting a stylus pen of a magnetic field type.

According to an embodiment, at least a part of the key input device 317 may be disposed in the side-surface bezel structure 318.

According to an embodiment, for example, the audio module 303 can include a microphone hole and the audio modules 307, 314 can include speaker holes. A microphone for acquiring external sound may be disposed inside the microphone hole, and in some embodiments, multiple microphones may be arranged to detect the direction of sound. The speaker holes may include an external speaker hole (as shown, the audio module 307) and a receiver hole (as shown, the audio module 314) for a call. In some embodiments, the speaker holes and the microphone hole may be implemented as one hole, or only a speaker may be included without the speaker holes (e.g., a piezo speaker).

According to an embodiment, for example, a sensor module (not shown) may be configured to generate an electrical signal or data value corresponding to an internal operation state of the electronic device 101 or an external environmental state. For example, a sensor module (not shown) may include a first sensor module (not shown) (e.g., a proximity sensor) and/or a second sensor module (not shown) (e.g., a fingerprint sensor) arranged on the front surface 310A of the housing 310. A sensor module (not shown) may include a third sensor module (not shown) (e.g., an HRM sensor) and/or a fourth sensor module (not shown) (e.g., a fingerprint sensor) arranged on the rear surface 310B of the housing 310. According to another embodiment (not shown), the fingerprint sensor may be disposed on the rear surface 310B as well as the front surface 310A (e.g., the display 301) of the housing 310. The electronic device 101 may further include a sensor module not illustrated therein, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment, for example, the camera modules 305 and 306 may include a front camera module 305 disposed on the front surface 310A of the electronic device 101, and a rear camera module 306 and/or a flash 304 arranged on the rear surface 310B. The camera modules 305 and 306 each may include one lens or multiple lenses, an image sensor, and/or an image signal processor. For example, the flash 304 may include a light-emitting diode or a xenon lamp. According to an embodiment, two or more lenses (an infrared camera lens, a wide-angle lens, and a telephoto lens) and image sensors may be arranged on one surface of the electronic device 101.

According to an embodiment, the key input device 317 may be disposed on the side surface 310C of the housing 310. According to another embodiment, the electronic device 101 may not include a part or all of the key input device 317 mentioned above, and the key input device 317 not included therein may be implemented as a different type such as a soft key, on the display 301.

According to an embodiment, for example, the light-emitting element (not shown) may be disposed on the front surface 310A of the housing 310. For example, the light-emitting element (not shown) may be configured to provide state information of the electronic device 101 in the form of light. According to another embodiment, for example, the light emitting element (not shown) may be configured to provide a light source interlocked with an operation of the camera module 305. For example, the light-emitting element (not shown) may include an LED, an IR LED, and/or a xenon lamp.

According to an embodiment, for example, the connector holes 308 and 309 may include a first connector hole 308 capable of accommodating a connector (for example, a USB connector) for transmitting and receiving power and/or data to and from an external electronic device or a connector (for example, an earphone jack) for transmitting and receiving audio signals to and from an external electronic device, and/or a second connector hole 309 capable of accommodating a storage device (e.g., a subscriber identification module (SIM) card). According to an embodiment, the first connector hole 308 and/or the second connector hole 309 may be omitted.

Figure 4:
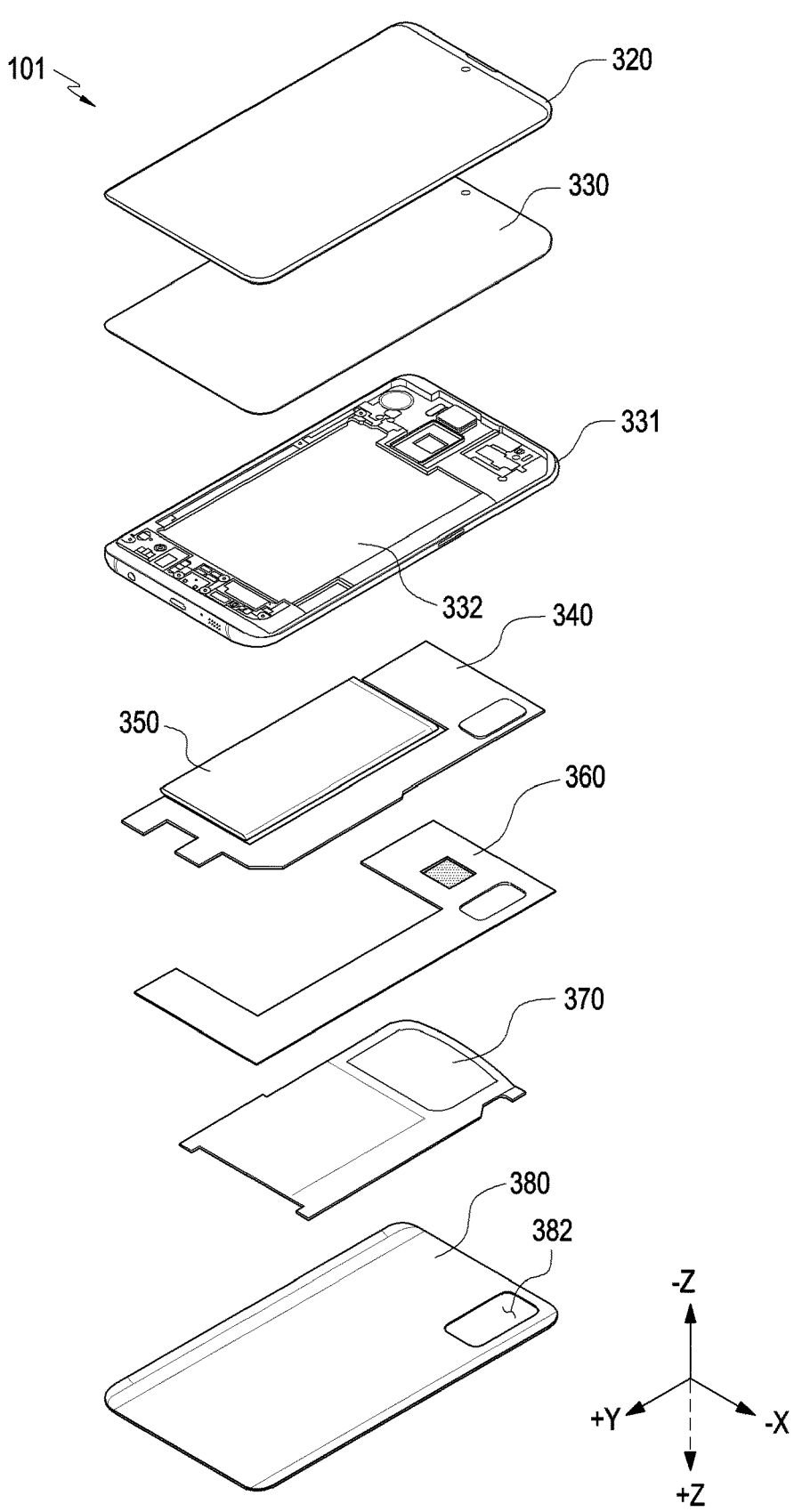
FIG. 4 is an exploded perspective view of an electronic device according to various embodiments of the disclosure.

FIG. 4 is an exploded perspective view of an electronic device according to various embodiments of the disclosure.

Referring to FIG. 4, an electronic device 101 (e.g., the electronic device 101 of FIG. 2 and FIG. 3) may include a front plate 320 (e.g., the front plate 302 of FIG. 2), a display 330 (e.g., the display 301 of FIG. 2), a first support member 332 (e.g., a bracket), a printed circuit board 340, a battery 350, a second support member 360 (e.g., a rear case), an antenna 370, and a rear plate 380 (e.g., the rear plate 311 of FIG. 3). In some embodiments, at least one (e.g., the first support member 332 or the second support member 360) of elements may be omitted from the electronic device 101, or other elements may be additionally included therein. At least one of elements of the electronic device 101 may be the same as or similar to at least one of elements of the electronic device 101 of FIG. 2 or FIG. 3, and overlapping descriptions will be omitted hereinafter.

According to an embodiment, the first support member 332 may be disposed inside the electronic device 101 to be connected to the side-surface bezel structure 331 or to be integrally formed with the side-surface bezel structure 331. For example, the first support member 332 may be formed of a metal material and/or a non-metal (e.g., polymer) material. The first support member 332 may have one surface to which the display 330 is coupled, and the other surface to which the printed circuit board 340 is coupled. The printed circuit board 340 may have a processor, a memory, and/or an interface, which are mounted thereon. For example, the processor may include one or more of a central processing unit, an application processor, a graphic processing unit, an image signal processor, a sensor hub processor, or a communication processor. According to an embodiment, for example, the memory may include a volatile memory or a non-volatile memory. According to an embodiment, for example, the interface may include a high definition multimedia interface (HDMI), a universal serial bus (USB) interface, an SD card interface, and/or an audio interface. For example, the interface may be configured to electrically or physically connect the electronic device 101 to an external electronic device, and may include a USB connector, an SD card/MMC connector, or an audio connector. According to an embodiment, the battery 350 (e.g., the battery 189 of FIG. 1) may be a device configured to supply power to at least one element (e.g., the camera module 312) of the electronic device 101, and for example, may include a non-rechargeable primary cell, a rechargeable secondary cell, or a fuel cell. For example, at least a part of the battery 350 may be disposed on substantially the same plane as the printed circuit board 340. The battery 350 may be integrally disposed inside the electronic device 101, or may be disposed to be detachable/attachable from/to the electronic device 101.

According to an embodiment, the second support member 360 (e.g., a rear case) may be disposed between the printed circuit board 340 and the antenna 370. For example, the second support member 360 may include one surface to which at least one of the printed circuit board 340 and the battery 350 is coupled, and the other surface to which the antenna 370 is coupled.

According to an embodiment, the antenna 370 may be disposed between the rear plate 380 and the battery 350. For example, the antenna 370 may include a near field communication (NFC) antenna, a wireless charging antenna, and/or a magnetic secure transmission (MST) antenna. For example, the antenna 370 may be configured to perform a short-range communication with an external device, or transmit/receive a power required for charging in a wireless.

For example, the antenna 370 may include a coil for wireless charging. In another embodiment, an antenna structure may be formed by a part of the side-surface bezel structure 331 and/or the first support member 332, or a combination thereof.

According to various embodiments, the electronic device 101 may include a camera module (e.g., the camera module 306 of the FIG. 3) disposed in a housing (e.g., the housing 310 of the FIG. 2). According to an embodiment, the camera module 306 may be disposed on the first support member 332, and may be a rear camera module (e.g., the camera module 312 of FIG. 3) capable of acquiring an image of a subject positioned at the rear side (e.g., the +Z direction) of the electronic device 101. According to an embodiment, at least a part of the camera module 312 may be exposed to the outside of the electronic device 101 through an opening 382 formed in the rear plate 380.

Although the electronic device 101 illustrated in FIG. 2 to FIG. 4 has a bar-type or a plate-type appearance, the disclosure may not be limited thereto. For example, the illustrated electronic device may be a rollable electronic device or a foldable electronic device. A "rollable electronic device" may mean an electronic device in which a display (e.g., the display 330 of FIG. 3) may be bent and transformed so that at least a part thereof is rolled or wound, or is accommodated in a housing (e.g., the housing 310 of FIG. 2). According to needs of a user, the rollable electronic device may have a display which is unfoldable or has a larger area capable of being exposed to the outside, so as to expand and use a screen display area. A "foldable electronic device" may mean an electronic device in which two different areas of a display can be folded to face each other or to face opposite directions. Generally, in a carrying state, the display of a foldable electronic device is configured such that two different areas thereof are folded in a state of facing each other or in opposite directions, and in an actual use state, by a user, the display may be unfolded such that the two different areas thereof form a substantially flat-plate shape. In some embodiments, the electronic device 101 according to various embodiments disclosed in the document may include various other electronic devices such as a notebook computer or a camera in addition to a portable electronic device such as a smartphone.

Figure 5:
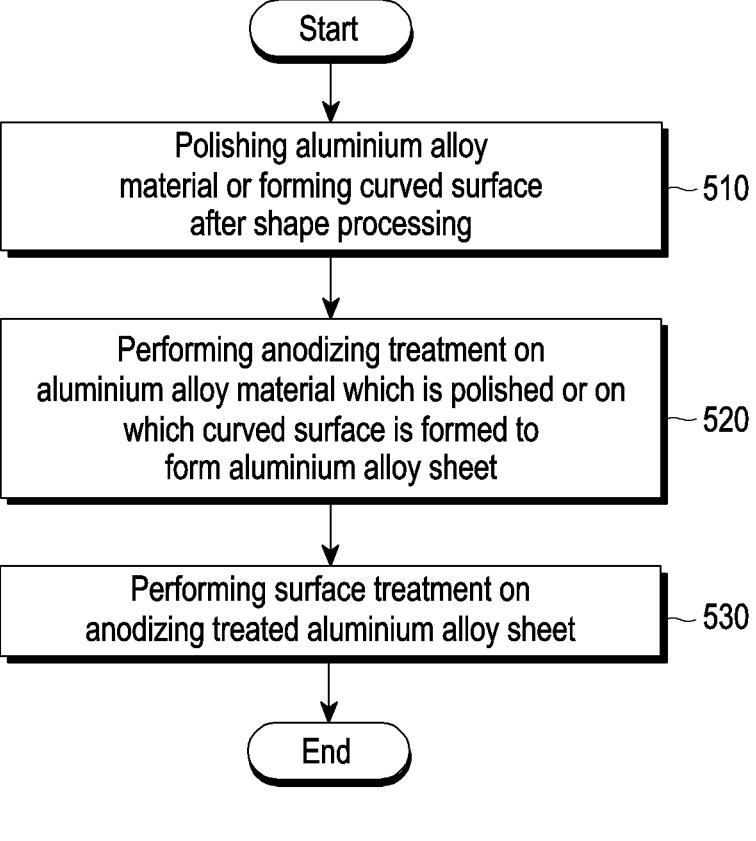
FIG. 5 is a flowchart relating to a sheet manufacturing method using an aluminum alloy according to various embodiments of the disclosure.
Figure 6:
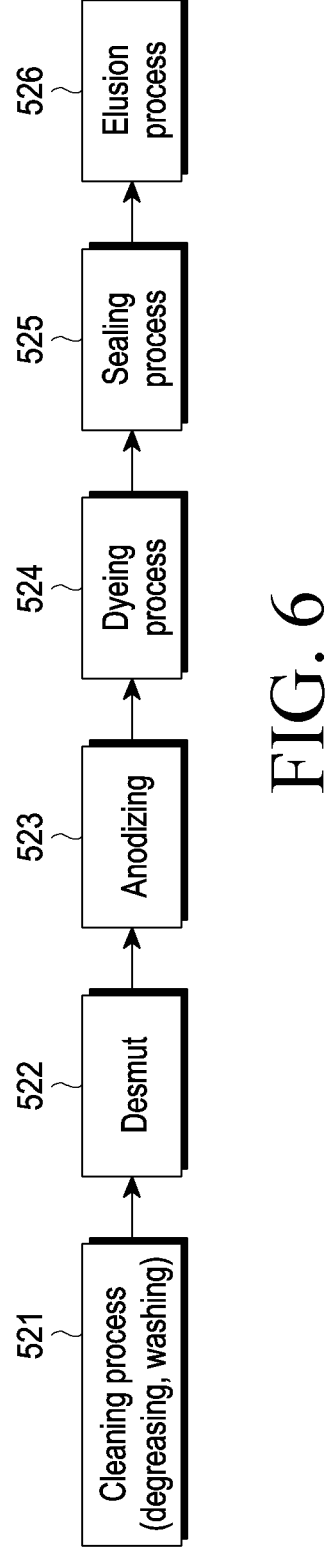
FIG. 6 is a flowchart relating to an anodizing process according to various embodiments of the disclosure.

FIG. 5 is a flowchart relating to a sheet manufacturing method using an aluminum alloy according to various embodiments of the disclosure. FIG. 6 is a flowchart relating to an anodizing process according to various embodiments of the disclosure.

Referring to FIG. 5 and FIG. 6, an aluminum sheet may be used as an exterior material or an interior material of at least a part of a housing (e.g., the housing 310 of FIGS. 2 to 3) of an electronic device (e.g., the electronic device 101 of FIG. 1 to FIG. 4), and may be manufactured by a process 510 of polishing an aluminum alloy material or forming a curved surface after shape processing, an anodizing process 520 including an anodizing treatment is performed on the polished aluminum alloy material or the aluminum alloy material on which the curved surface is formed so as to form an aluminum sheet, and a process 530 of performing a surface treatment on the anodizing treated aluminum sheet.

According to various embodiments, the process 510 may include a polishing process and/or a curved surface forming process which is performed on the aluminum alloy material after a designated shape including at least a part of the outer shape of an electronic device is processed.

According to various embodiments, the polishing process may be performed for implementing a high gloss on the surface of the aluminum sheet to be applied to the electronic device, and the polishing process may include a physical polishing process and/or an electropolishing process.

According to various embodiments, the polishing process may be performed by an electropolishing process after performing a physical polishing process. As another example, a physical polishing process may be performed after performing an electropolishing process. As another example, a physical polishing process and an electropolishing process may be selectively performed.

According to various embodiments, a physical polishing (e.g., buffing and/or polishing) process may be performed in a state of touching a rotating polishing device on the surface of the aluminum alloy material. For example, the polishing device may include a jig movable in the horizontal and/or the vertical direction and a member such as polishing cloth, paper, leather, and/or polymer which may cause physical friction and are mounted to the jig.

According to various embodiments, a polishing cloth of the polishing device is rotated while pressing the surface of the aluminum alloy material seated on the jig of the polishing device with a predetermined pressure, thereby performing polishing. The rotation speed and the pressure of the polishing device, which presses the aluminum alloy material, may be variously changed according to user settings. The physical polishing process may include wet polishing in which the surface of the aluminum alloy material is polished in a wet state and dry polishing in which the surface of the aluminum alloy material is polished in a dry state, and the wet polishing and the dry polishing may be selectively used. As another example, the wet polishing and dry polishing may be performed in parallel.

According to various embodiments, when the polishing processes are switched, before the polishing process, and/or in the time between multiple polishing processes, a washing process may be performed. The surface gloss of the aluminum alloy material may be more efficiently achieved through the washing process.

According to various embodiments, after the polishing process (for example, the physical polishing and/or the electropolishing process) is performed on the aluminum alloy material, the curved surface forming process may be performed. The curved surface forming process may be performed after a physical polishing process is performed or after an electropolishing process is performed. As another example, the curved surface forming process may be performed after a physical polishing process and an electrolytic process are sequentially performed, or may be performed in a state where the polishing process is not performed.

According to various embodiments, the curved surface forming process may be performed for implementing a high gloss on the surface of the aluminum sheet to be applied to the electronic device, and may include a method of applying a force physically and/or a method of applying a force chemically. As a method of applying a force chemically, for example, there may be a chemical polishing method performed by adding an acidic etchant and an electropolishing method which is a method of polishing a surface by applying a voltage to a phosphoric acid/chromic acid solution.

According to various embodiments, in the anodizing process 520, the polished or the curved aluminum alloy material can be anodized. The anodizing process may be performed after the polishing process is performed or may be performed after the curved surface forming process is performed. As another example, the anodizing process may be performed after the polishing process and the curved surface forming process are sequentially performed, or may be performed in a state where the polishing process or the curved surface forming process is not performed.

According to various embodiments, the anodizing process may include a cleaning process 521, a desmut process 522, an anodizing process 523, a dyeing process 524, a sealing process 525, and/or an elution process 526. As another example, the anodizing process may include a cleaning process, an anodizing process, a sealing process, and/or an elution process performed by utilizing the metallic color itself of the aluminum alloy material.

According to various embodiments, the cleaning process 521 may be carried out to remove the oil (e.g., cutting oils, polish residues, etc.) and impurities remaining on the surface of the aluminum alloy material to be applied to the electronic device, and the washing method thereof may include a degreasing process and/or a washing process. According to various embodiments, in the degreasing process, an acid degreaser (e.g., pH 7.0 or less), an alkaline degreaser (pH 7.0 or higher), or a neutral degreaser may be used, and immersion time and/or temperature conditions may be appropriately applied according to the characteristics and specifications of the aluminum alloy material.

According to various embodiments, the desmut process 522 may be performed for removing metal impurities remaining on the surface of the aluminum alloy material to be applied to the electronic device 101 and adjusting the surface thereof, and may be performed after the cleaning process 521 is performed.

According to various embodiments, the solution used in the desmut process 522 may be an acidic solution, and for example, sulfuric acid or nitric acid may be used. The concentration thereof may be about 5 g/L to 800 g/L, temperature thereof may be a room temperature or higher, and the immersion time thereof may be about 5 seconds to 30 minutes. After appropriately adjusting the conditions according to the characteristics and specifications of the aluminum alloy material, the desmut process 522 may be performed.

According to various embodiments, the anodic oxidation process (or the anodizing process) 523 is performed to produce an oxide film on the surface of the aluminum alloy material. For this, after preparing a device for accommodating an electrolyte containing at least one or all of sulfuric acid, oxalic acid, phosphoric acid, or chromic acid, in a state of submerging the aluminum alloy material in the electrolyte accommodated in the device, a predetermined voltage and temperature may be applied to perform the anodizing process.

According to various embodiments, the dyeing process 524 may be performed for providing various colors to a finished aluminum sheet. For example, the dyeing process 524 may be performed for coloring a dye by using an aqueous method of submerging a material into water dissolved an organic dye after a primary and a secondary oxide film are formed. According to an embodiment, it may be possible to color in the pores of the oxide film formed through the anodizing process 523. The temperature of a coloring tank may be about 30 to 60° C., and as necessary, the dye concentration may be adjusted in the range of about 0.1 g/L to 10 g/L by adding a dye.

Hereinafter, in the case of forming an oxide film according to the anodizing process according to various embodiments of the disclosure, a detailed method of generating an oxide film structure including snowflake structures by using variable voltage and giving a pearl effect will be described.

Figure 7:
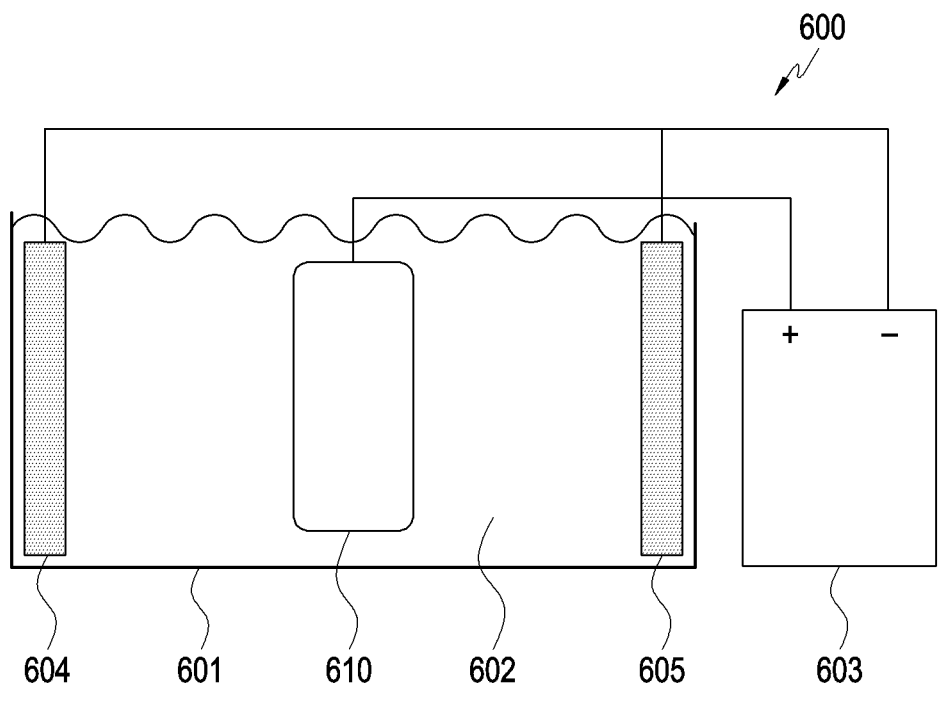
FIG. 7 is a view showing a method of performing an anodizing process on an aluminum alloy material according to various embodiments of the disclosure.
Figure 8:
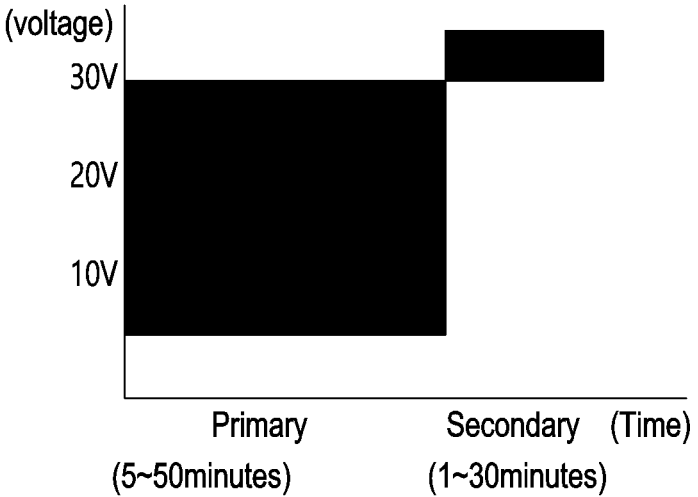
FIG. 8 is a graph showing a relationship between a primary voltage and a secondary voltage during an anodizing process according to various embodiments of the disclosure.
Figure 9:
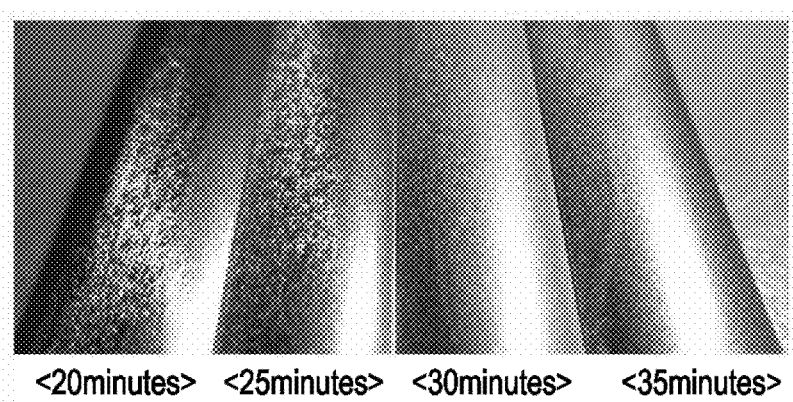
FIG. 9 is a view showing a change in pearl appearance according to a change in time during a secondary anodizing process under a predetermined condition according to an embodiment of the disclosure.
Figure 10:
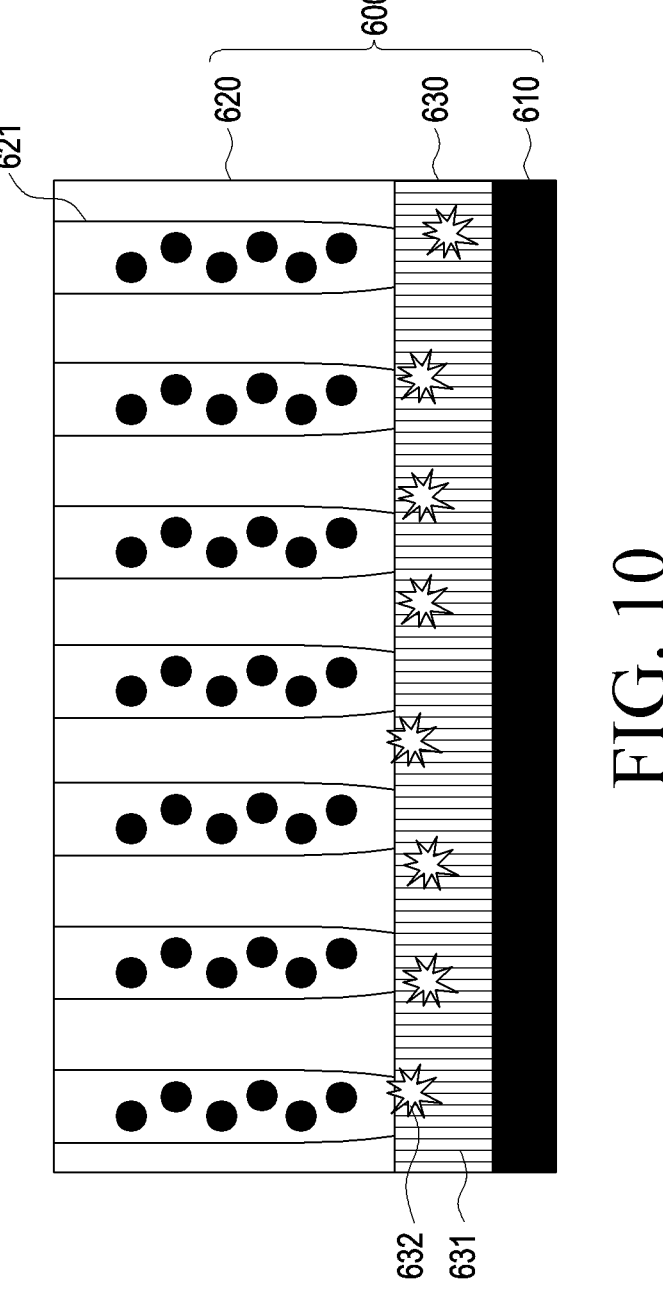
FIG. 10 is a view showing an oxide film including multiple layers generated on the surface of an aluminum alloy material after an anodizing process according to various embodiments of the disclosure.
Figure 11:
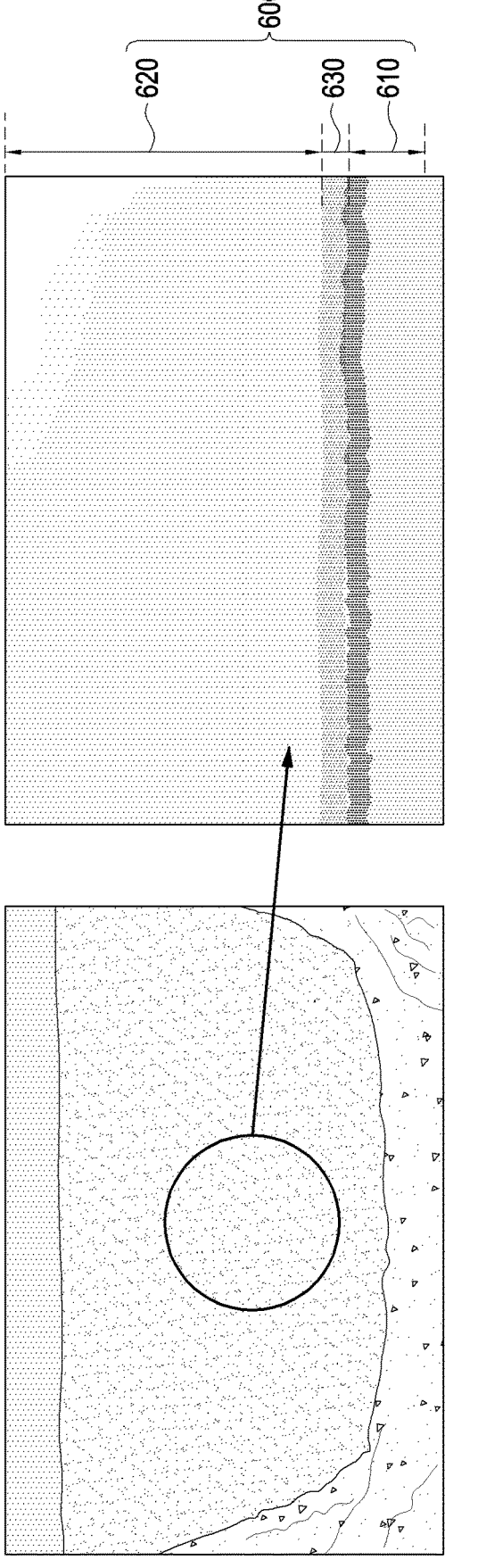
FIG. 11 is a view showing a photographed image of an oxide film including multiple layers generated on the surface of an aluminum alloy material after an anodizing process according to various embodiments of the disclosure.
Figure 12:
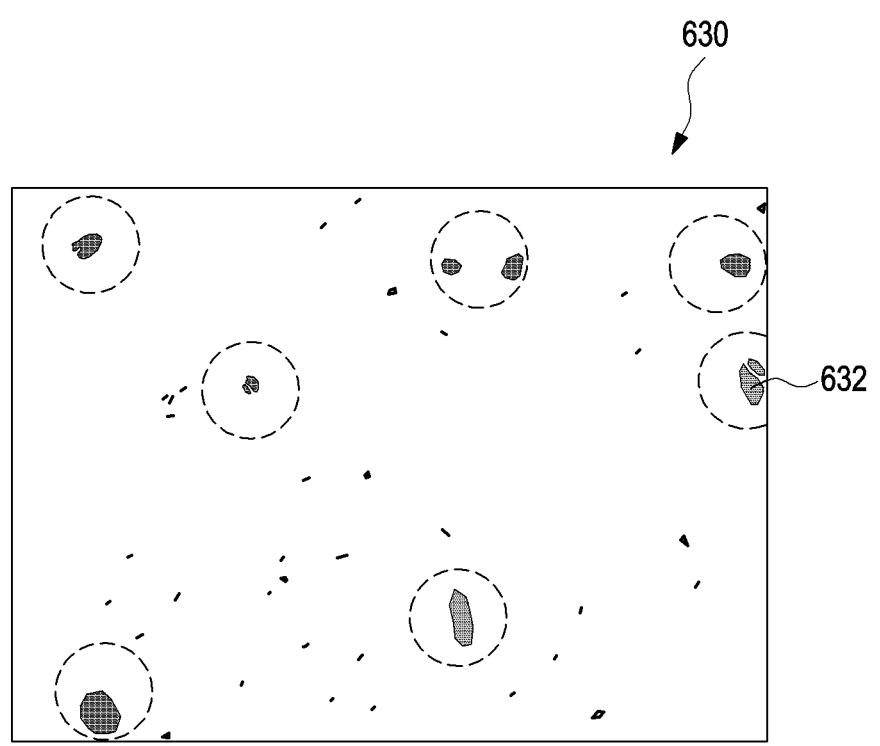
FIG. 12 is a view showing an image in which snowflake structures are arranged according to the time of applying a secondary constant-voltage according to various embodiments of the disclosure.
Figure 13:
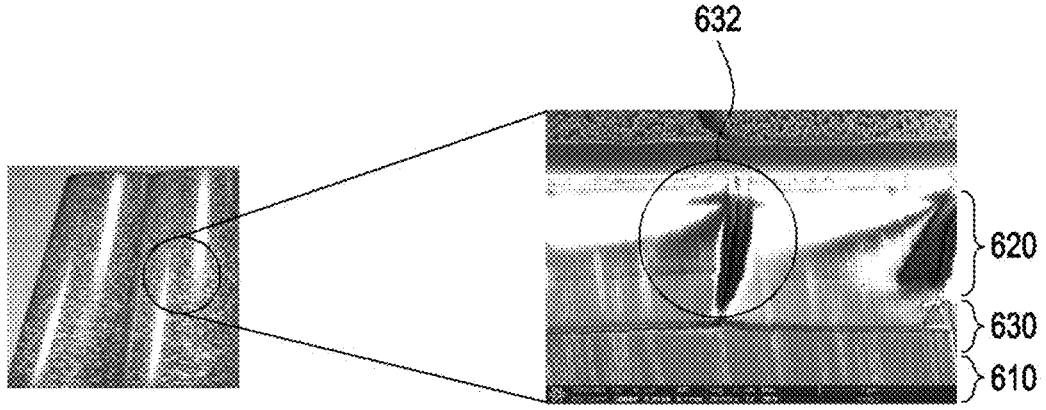
FIG. 13 is an enlarged cross-sectional view of a housing 600 including snowflake structures 632 according to various embodiments of the disclosure.
Figure 14:
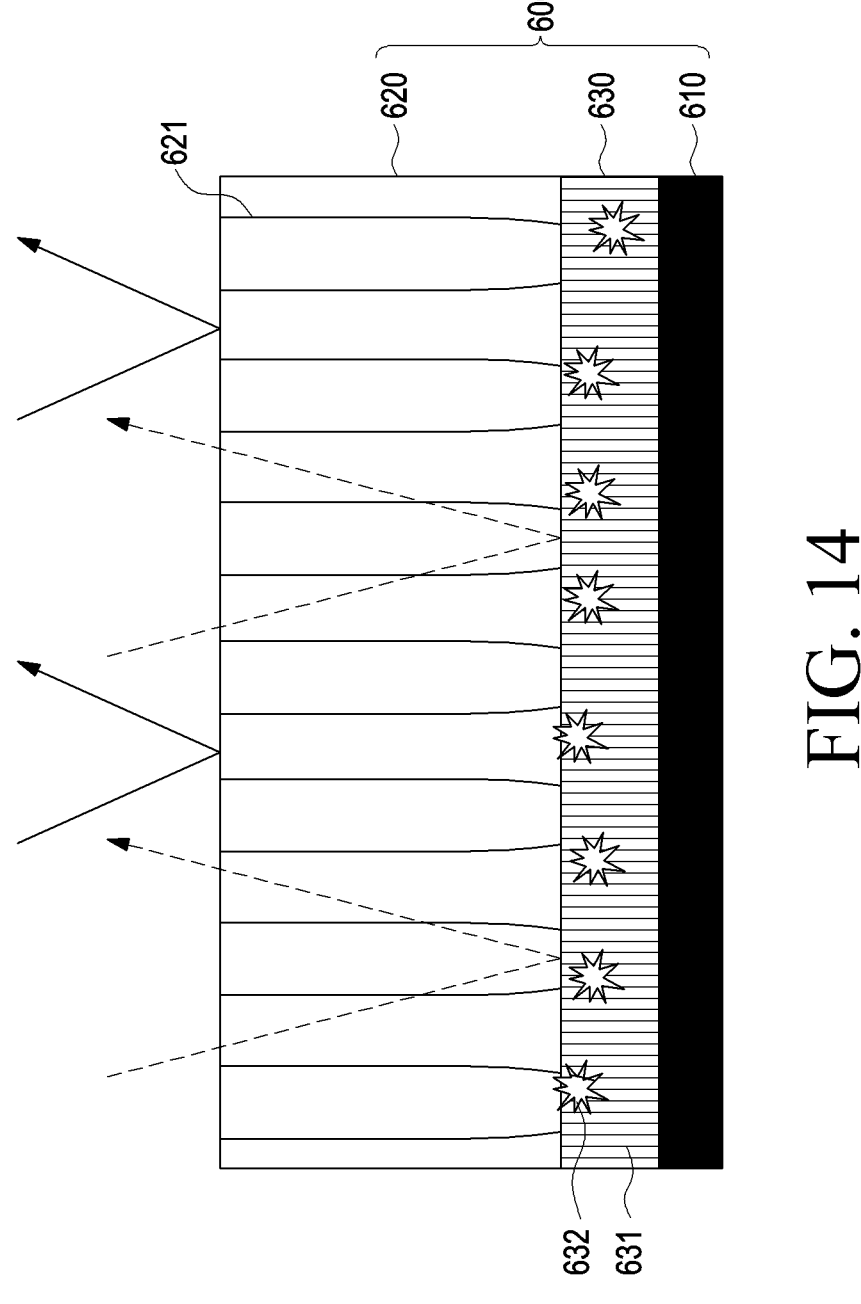
FIG. 14 is a view showing the reflection of light and a cross-section of an oxide film including multiple layers generated on the surface of an aluminum alloy layer after an anodizing process according to various embodiments of the disclosure.
Figure 15:
FIG. 15 is a view showing an aluminum alloy including snowflake structures and having pearl appearance according to various embodiments of the disclosure.

FIG. 7 is a view showing a method of performing an anodizing process 520 on an aluminum alloy layer 610 according to various embodiments of the disclosure. FIG. 8 is a graph showing a relationship between a primary voltage and a secondary voltage during an anodizing process 520 according to various embodiments of the disclosure. FIG. 9 is a view showing a change in pearl appearance according to a change in time during a secondary anodizing process under a predetermined condition according to an embodiment of the disclosure. FIG. 10 is a view showing the cross-section of an oxide film including multiple layers generated on the surface of an aluminum alloy layer 610 after an anodizing process 520 according to various embodiments of the disclosure. FIG. 11 is a view showing a photographed image of an oxide film including multiple layers generated on the surface of an aluminum alloy layer 610 after an anodizing process 520 according to various embodiments of the disclosure. FIG. 12 is a view showing an image in which snowflake structures 632 are arranged according to the time of applying a secondary constant-voltage according to various embodiments of the disclosure. FIG. 13 is an enlarged cross-sectional view of a housing 600 including snowflake structures 632 according to various embodiments of the disclosure. FIG. 14 is a view showing the reflection of light and a cross-section of an oxide film including multiple layers generated on the surface of an aluminum alloy layer 610 after an anodizing process 520 according to various embodiments of the disclosure. FIG. 15 is a view showing an aluminum alloy including snowflake structures 632 and having pearl appearance according to various embodiments of the disclosure.

Referring to FIG. 7 to FIG. 15, the anodizing process 520 may be performed by the following processes of filling an electrolyte container 601 with an electrolyte 602, connecting a first electrode 604 and a second electrode 605 to the anode (−) of a battery 603 while at least a part thereof is submerged in the electrolyte 602, and sequentially applying a primary constant-voltage and a secondary constant-voltage through the battery 603 in a state where an aluminum alloy layer 610, which is connected to the cathode (+) of the battery 603 and is between the first electrode 604 and the second electrode 605, is completely submerged in the electrolyte 602.

Referring to FIG. 7 to FIG. 15, the electronic device 101 may include a display (e.g., the display 301 of FIG. 2) and a housing 600. At least a part of the housing 600 may include an aluminum alloy layer 610 processed to a designated shape, a first film layer 620 formed on the aluminum alloy layer 610, and a second film layer 630 formed between the aluminum alloy layer 610 and the first film layer 620. All or a part of the configuration of the housing 600 of FIG. 7 to FIG. 13 may be the same as the configuration of the housing 310 of FIG. 2.

According to various embodiments, the anodizing process 520 may be performed multiple times. For example, a first anodizing process 520a and a second anodizing process 520b may be sequentially performed. The constant-voltages applied to the first anodizing process 520a and the second anodizing process 520b may be different.

According to various embodiments, the electrolyte 602 used in the anodizing process 520 may include at least one or all of sulfuric acid, oxalic acid, phosphoric acid, or chromic acid. For example, a sulfuric acid solution having a concentration of about 150 g/L to 300 g/L may be used as the electrolyte 602.

According to various embodiments, the anodizing process 520 may be performed at a temperature of, for example, about 25° C. or less. For example, the anodizing process 520 may be performed at a temperature in the range of about 0° C. to 25° C.

According to various embodiments, the first film layer 620 may be formed on the surface of the aluminum alloy layer 610 by the primary constant-voltage. According to an embodiment, the first film layer 620 may be a pore-type anodizing film and may include multiple first film pores 621. According to various embodiments, referring to FIG. 8, the primary constant-voltage may be applied within a range satisfying a predetermined condition according to a desired thickness of the first film layer 620. According to an embodiment, the primary constant-voltage may be applied for about 5 minutes to about 50 minutes within a range of about 6 V to 30 V, based on the desired thickness of the first film layer 620, which is about 5 μm to 20 μm (as shown in FIG. 8). According to another embodiment, the primary constant-voltage may be applied in a range of about 10 V to 20 V.

According to various embodiments, after applying the primary constant-voltage thereto, a second film layer 630 may be formed on the surface of the aluminum alloy layer 610 by the secondary constant-voltage. According to an embodiment, the second film layer 630 may be formed directly on the surface of the aluminum alloy layer 610 so as to be positioned between the first film layer 620 and the surface of the aluminum alloy layer 610. According to an embodiment, the second film layer 630 may be a pore-type anodizing film and may include multiple second film pores 631.

According to various embodiments, referring to FIG. 8, after the primary constant-voltage is applied thereto, the secondary constant-voltage may be applied with a voltage higher than the primary constant-voltage. For example, the secondary constant-voltage may be applied with a voltage of 1 V to 3 V higher than the primary constant-voltage. For example, the secondary constant-voltage may be applied in a range of 30 V or more (as shown). In another example, the primary constant-voltage can be applied at about 15 V and the secondary constant-voltage can be applied at about 16 V to 18 V. According to various embodiments, the method of the disclosure may be a method in which the primary constant-voltage is low (with respect to the secondary constant-voltage) and the secondary constant-voltage is high (with respect to the primary constant-voltage) and to which an interlayer surface stress is applied. The current may be maintained below, for example, about 3 A over the duration of both the primary constant-voltage and the secondary constant-voltage. According to an embodiment, the multiple first film pores 621 formed in the first film layer 620 by the primary constant-voltage and the multiple second film pores 631 formed in the second film layer 630 by the secondary constant-voltage 631 may have different sizes. For example, the multiple second film pores 631 formed in the second film layer 630 by secondary constant-voltage may have sizes smaller than those of the multiple first film pores 621. As used herein, a "size" of a pore can refer to an individual pore size, or to an average or "nominal" size (e.g., diameter, circumference, etc.) of a plurality of pores (or all pores). For example, a "size" of a pore can be empirically determined as the average diameter of the pores.

According to an embodiment, when primary anodizing and secondary anodizing are sequentially performed under a predetermined condition, the change in a pearl appearance may be observed according to the time of applying the secondary constant-voltage thereto. The corresponding experiment may be performed at a temperature of the range of about 5° C. to 15° C., and a sulfuric acid solution having a concentration of about 200 g/L to 280 g/L is used as the electrolyte. For example, a sulfuric acid solution having a concentration of about 240 g/L may be used as the electrolyte. For example, the corresponding experiment may be performed at a temperature of 10° C. In the case of the primary anodizing, the primary constant-voltage may be applied for about 7 to 12 minutes with about 10 V to 14 V. For example, in the case of primary anodizing, the primary constant-voltage may be applied for about 10 minutes with about 12 V. In the case of the secondary anodizing, the secondary constant-voltage is applied with about 10 V to 15 V, and the pearl appearances are compared according to the applied times. For example, the secondary constant-voltage may be applied with about 13 V. According to the experimental results, referring to FIG. 9, it may be identified that the manifestation of the pearl appearance begins when 20 minutes elapse, and it may be identified that the visibility of the pearl appearance is the best at 25 minutes. In addition, it may be identified that the pearl appearance decreases after 30 minutes. Accordingly, under the above conditions, when the primary anodizing is performed for 10 minutes at about 12 V and the secondary anodizing is performed for 25 minutes at about 13 V, an optimal pearl appearance may be implemented.

According to various embodiments, referring to FIG. 9 or FIG. 11, between about 1 to 30 minutes after applying the secondary constant-voltage, snowflake structures 632 may be arranged in the vicinity of the surface layer of the second film layer 630 adjacent to the first film layer 620 as time increases. According to an embodiment, the snowflake structures 632 may be formed under the multiple first film pores 621 formed in the first film layer 620. Due to the characteristics of anodizing, the snowflake structures 632 grow on a film. In the case, since the first film layer 620 and the second film layer 630 have different expansion values, the multiple first film pores 621 formed in the first film layer 620 and the multiple second pores 631 formed in the second film layer 630 may crack due to the size differences thereof. The snowflake structures 632 may be a scattered reflection interlayer crack caused by stress at the film interface. Accordingly, referring to FIG. 13, it may be possible to implement a sparkling pearl appearance due to the snowflake structures 632, light reflection, and light scattered reflection on the surface thereof without adding a physical or a chemical process.

According to various embodiments, referring to FIG. 9 to FIG. 10, the thickness of the first film layer 620 or the second film layer 630 may be changed according to process conditions such as a constant-voltage or applied time. According to an embodiment, the thickness of the first film layer 620 and the thickness of the second film layer 630 may be different. For example, the thickness of the second film layer 630 may be thinner than the thickness of the first film layer 620. According to an embodiment, for example, when the first film layer 620 has a thickness of about 6.8 μm, the second film layer 630 may have a thickness of about 3.5 μm. For example, the thickness ratio of the first film layer 620 and the second film layer 630 may be about 2:1.

According to various embodiments, referring to FIG. 12, the reflectivity of the second film layer 630 may be lower than the reflectivity of the first film layer 620. For example, when the reflectivity of the first film layer 620 is about GU 100, the reflectivity of the second film layer 630 may be about GU 60 or more and GU 80 or less. For example, when the reflectivity of the first film layer 620 is about GU 100, the reflectivity of the second film layer 630 may be about GU 60 or more and GU 80 or less.

An electronic device (e.g., the electronic device 101 of FIG. 1 to FIG. 4) according to various embodiments of the disclosure may include a display (e.g., the display 301 of FIG. 2); and a housing (e.g., the housing 310 of FIG. 2 to FIG. 3) adjacent to the display, wherein at least a part of the housing may include: an aluminum alloy layer (e.g., the aluminum alloy layer 610 of FIG. 9); a first film layer (e.g., the first film layer 620 of FIG. 9) formed on the aluminum alloy layer; and a second film layer (e.g., the second film layer 630 of FIG. 9) which is formed between the aluminum alloy layer and the first film layer and includes multiple snowflake structures (e.g., the snowflake structures 632 of FIG. 9) arranged adjacent to the first film layer, the first film layer may be formed by a first anodizing process using a first voltage on the aluminum alloy layer, and the second film layer may be formed by a second anodizing process using a second voltage on the aluminum alloy layer after the first anodizing process.

According to various embodiments, the second voltage may be higher than the first voltage.

According to various embodiments, the first voltage may be 6 V or more and 30 V or less.

According to various embodiments, the second voltage may be 1 V to 3 V higher than the first voltage.

According to various embodiments, the first film layer may include multiple first film pores (e.g., the multiple first film pores 621 of FIG. 9), and the second film layer may include multiple second film pores (e.g., the multiple second film pores 631 of FIG. 9).

According to various embodiments, sizes of the multiple first film pores formed in the first film layer and sizes of the multiple second film pores formed in the second film layer may be different from each other.

According to various embodiments, the time, for which the first voltage is applied, may be determined according to the thickness of the first film layer.

According to various embodiments, a thickness of the first film layer may be 5 μm or more and 20 μm or less.

According to various embodiments, the time, for which the first voltage is applied, may be 5 minutes or more and 50 minutes or less, and the time, for which the second voltage is applied, may be 1 minute or more and 30 minutes or less.

A method for processing an aluminum exterior material according to various embodiments may include: a process of processing an aluminum alloy layer into a designated shape; and a process of performing an anodizing treatment on the processed aluminum alloy layer, wherein the process of the anodizing treatment may include: a process of a first anodizing treatment of forming a first film layer on the processed aluminum alloy layer by using a first voltage on the processed aluminum alloy layer; and after performing the first anodizing treatment, a process of a second anodizing treatment of forming a second film layer on the processed aluminum alloy layer by using a second voltage, and the second film layer may be positioned between the first film layer and the processed aluminum alloy layer and may include multiple snowflake structures arranged adjacent to the first film layer.

According to various embodiments, a process of polishing the processed aluminum alloy or forming a curved surface may be further included therein.

According to various embodiments, a process of performing a surface treatment on the anodizing treated aluminum alloy may be further included therein.

According to various embodiments, the process of the anodizing treatment may further include a cleaning process, a dyeing process, a sealing process, and an elution process.

According to various embodiments, the second voltage may be higher than the first voltage.

According to various embodiments, the first voltage may be 6 V or more and 30 V or less.

According to various embodiments, the second voltage may be 1 V to 3 V higher than the first voltage.

According to various embodiments, the first film layer may include multiple first film pores, and the second film layer may include multiple second film pores.

According to various embodiments, sizes of the multiple first film pores formed in the first film layer and sizes of the multiple second film pores formed in the second film layer may be different from each other.

According to various embodiments, the time, for which the first voltage is applied, may be determined according to the thickness of the first film layer.

According to various embodiments, a thickness of the first film layer may be 5 μm or more and 20 μm or less.

An anodized aluminum alloy sheet and a manufacturing method thereof of various embodiments of the disclosure described above may not be limited by the above-described embodiments and drawings, and it will be obvious to a person skilled in the technical field, to which the disclosure belongs, that various substitutions, modifications, and changes are possible within the technical scope of the disclosure.

What is claimed is:

1. An electronic device comprising:
a display; and
a housing adjacent to the display, wherein at least a part of the housing comprises:
   an aluminum alloy layer;
   a first oxide film layer formed on the aluminum alloy layer, comprising multiple first film pores disposed inside the first oxide film layer and comprising a reflectivity of about 100 gloss units (GU); and
   a second oxide film layer formed between the aluminum alloy layer and the first oxide film layer, comprising multiple second film pores and multiple snowflake structures and a reflectivity of between 60 and 80 GU,
wherein the housing is configured to provide an etch-free, sanding-free sparkling pearl appearance visible from an outside of the housing by light reflection or light scattering reflection on at least one of a surface of the first oxide film layer, a surface of the second oxide film layer, or the snowflake structure; and
wherein pore sizes of the first film pores are greater than pore sizes of the second film pores, and the snowflake structures comprise scattered reflection interlayer cracks caused by stress at a film interface between the first oxide film layer and the second oxide film layer resulting from the differences between an expansion value of the first oxide film layer and an expansion value of the second oxide film layer.

2. The electronic device of claim 1, wherein an interior of at least one of the multiple first film pores or the multiple second film pores is colored.

3. The electronic device of claim 1, wherein a time for which the first voltage is applied is determined according to a thickness of the first oxide film layer.

4. The electronic device of claim 1, wherein a thickness of the first oxide film layer is 5 μm or more and 20 μm or less.

5. The electronic device of claim 1, wherein the first oxide film layer is formed by a first anodizing process using a first voltage on the aluminum alloy layer and the second oxide film layer is formed by a second anodizing process using a second voltage on the aluminum alloy layer after the first anodizing process, and wherein the second voltage is higher than the first voltage.

6. The electronic device of claim 5, wherein the first voltage is 6 V or more and 30 V or less.

7. The electronic device of claim 5, wherein the second voltage is 1 V to 3 V higher than the first voltage.

8. The electronic device of claim 5, wherein:

a time for which the first voltage is applied is 5 minutes or more and 50 minutes or less.

9. A method for processing an aluminum exterior material, the method comprising:

processing an aluminum alloy layer into a designated shape; and performing an anodizing treatment on the processed aluminum alloy layer, the anodizing treatment resulting in an etch-free, sanding-free texturization of the aluminum exterior material, wherein performing the anodizing treatment comprises:

a first anodizing treatment comprising forming a first film layer on the processed aluminum alloy layer by using a first voltage on the processed aluminum alloy layer, the first anodizing treatment tuned such that the first film layer comprises a reflectivity of about 100 gloss units (GU); and after performing the first anodizing treatment, a second anodizing treatment comprising forming a second film layer on the processed aluminum alloy layer by using a second voltage greater than the first voltage, the second anodizing treatment held for at least 20 minutes and less than 30 minutes, the second anodizing treatment tuned such that the second film layer comprises a reflectivity of between 60 and 80 GU, wherein the second film layer is positioned between the first film layer and the processed aluminum alloy layer and comprises multiple snowflake structures arranged adjacent to the first film layer, further comprising polishing the processed aluminum alloy or forming a curved surface, and wherein pore sizes of first film pores of the first film layer are greater than pore sizes of second film pores of the second film layer, and the snowflake structures comprise scattered reflection interlayer cracks caused by stress at a film interface between the first film layer and the second film layer resulting from the difference between an expansion value of the first film layer and an expansion value of the second film layer.

10. The method of claim 9, further comprising performing a surface treatment on the anodize treated aluminum alloy.

11. The method of claim 9, wherein the performing of the anodizing treatment further comprises cleaning, dyeing, sealing, and elution.

12. The method of claim 9, wherein the first voltage is 6 V or more and 30 V or less.

13. The method of claim 9, wherein the second voltage is 1 V to 3 V higher than the first voltage.

14. The method of claim 9, wherein a time, for which the first voltage is applied, is determined according to a thickness of the first film layer.

15. The method of claim 9, wherein a thickness of the first film layer is 5 μm or more and 20 μm or less.

* * * * *